(12) United States Patent
Jung

(10) Patent No.: US 8,922,091 B2
(45) Date of Patent: Dec. 30, 2014

(54) SPINDLE MOTOR

(75) Inventor: Heechul Jung, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 185 days.

(21) Appl. No.: 13/162,175

(22) Filed: Jun. 16, 2011

(65) Prior Publication Data

US 2011/0309713 A1    Dec. 22, 2011

(30) Foreign Application Priority Data

Jun. 16, 2010  (KR) .......................... 10-2010-0057266

(51) Int. Cl.
| | | |
|---|---|---|
| *H02K 5/16* | (2006.01) | |
| *G11B 19/20* | (2006.01) | |
| *H02K 1/18* | (2006.01) | |
| *F16C 33/10* | (2006.01) | |

(52) U.S. Cl.
CPC ............ *H02K 5/163* (2013.01); *G11B 19/2009* (2013.01); *H02K 1/187* (2013.01); *F16C 33/104* (2013.01)
USPC ....... 310/216.052; 310/216.009; 310/216.016

(58) Field of Classification Search
CPC ..................................................... H02K 1/187
USPC .................... 310/216.052, 216.113, 216.009, 310/216.016
See application file for complete search history.

(56) References Cited

U.S. PATENT DOCUMENTS

| | | | | |
|---|---|---|---|---|
| 3,845,339 | A * | 10/1974 | Merkle et al. ............ | 310/156.34 |
| 5,173,628 | A * | 12/1992 | Yoshida et al. ................. | 310/71 |
| 5,457,350 | A * | 10/1995 | Sakamaki et al. ..... | 310/216.043 |
| 6,455,961 | B1 * | 9/2002 | Higuchi ...................... | 310/67 R |
| 6,481,161 | B1 * | 11/2002 | Thurnher ....................... | 49/362 |
| 6,921,993 | B2 * | 7/2005 | Xu et al. ...................... | 310/67 R |
| 6,960,860 | B1 * | 11/2005 | DeCristofaro et al. | 310/216.113 |
| 7,150,565 | B1 * | 12/2006 | Koyama et al. ............... | 384/450 |
| 7,436,625 | B1 * | 10/2008 | Chiou et al. ............... | 360/98.07 |
| 7,453,174 | B1 * | 11/2008 | Kalsi ............................... | 310/52 |
| 7,521,831 | B2 * | 4/2009 | Smirnov et al. ................ | 310/90 |
| 7,604,466 | B2 * | 10/2009 | Dreiman et al. ................ | 418/63 |
| 8,084,907 | B2 * | 12/2011 | Kim et al. ....................... | 310/90 |
| 2002/0050749 | A1 * | 5/2002 | Higuchi ...................... | 310/67 R |

(Continued)

FOREIGN PATENT DOCUMENTS

| | | |
|---|---|---|
| CN | 10-1656442 A | 2/2010 |
| JP | 2006-136090 A | 5/2006 |
| KR | 10-0771327 B1 | 10/2007 |

OTHER PUBLICATIONS

Office Action dated Jan. 30, 2012 in Korean Application No. 10-2010-0057266, filed Jun. 16, 2010.

(Continued)

*Primary Examiner* — Alex W Mok
(74) *Attorney, Agent, or Firm* — Saliwanchik, Lloyd & Eisenschenk

(57) ABSTRACT

A spindle motor is provided, the motor including a bearing assembly including a bearing housing that further includes a housing body and a plurality of staircase sills formed at a periphery of the bearing housing, and a bearing disposed inside the bearing housing; a stator including a core that further includes core pieces formed with through holes at which each of the staircase sills is hitched, and a coil wound on the core; a rotation shaft inserted into a rotation shaft hole of the bearing; and a rotor including a yoke coupled to the rotation shaft and a magnet secured at an inner lateral surface of the yoke to face the core.

17 Claims, 5 Drawing Sheets

(56) References Cited

U.S. PATENT DOCUMENTS

| | | | |
|---|---|---|---|
| 2007/0257574 A1* | 11/2007 | Kim et al. | 310/90 |
| 2008/0279492 A1* | 11/2008 | Obara | 384/100 |
| 2009/0080817 A1* | 3/2009 | Gomyo | 384/121 |
| 2010/0225195 A1* | 9/2010 | Asano et al. | 310/216.067 |
| 2011/0006634 A1* | 1/2011 | Nomura et al. | 310/216.113 |
| 2011/0140566 A1* | 6/2011 | Nakahara et al. | 310/216.018 |

OTHER PUBLICATIONS

Office Action dated Sep. 2, 2014 in Chinese Application No. 201110162202.2.

* cited by examiner

SPINDLE MOTOR

CROSS-REFERENCE TO RELATED APPLICATION

This application claims the benefit under 35 U.S.C. §119 of Korean Patent Application No. 10-2010-0057266, filed Jun. 16, 2010, which is hereby incorporated by reference in its entirety.

BACKGROUND OF THE DISCLOSURE

The present disclosure relates to a spindle motor. A spindle motor performs the function of rotating a disk to enable an optical pickup which linearly reciprocates in an optical disk drive (ODD) and a hard disk to read data recorded on the disk. The ODDs have been recently developed to stably rotate an optical disk at a high speed.

The ODD includes a spindle motor for rotating an optical disk at a high speed. The spindle motor includes a bearing housing, a bearing housed in the bearing housing, a rotation shaft inserted into the bearing, a rotor coupled to the rotation shaft and including a magnet, a core including a plurality of iron pieces secured at a periphery of the bearing housing, and a stator including a coil wound on the core.

Alteration or change of rotational characteristics of the spindle motor may be realized by changing the number of iron pieces of the core. The iron pieces of core according to prior art are simply secured on the periphery of the bearing housing, such that, if the number of iron pieces in the core of the spindle motor is changed, height of core and position of magnet in the rotor cannot be accurately aligned, and if the number of iron pieces in the core is changed, disadvantage of re-designing the bearing housing has occurred. That is, the bearing housing has to be re-designed and then manufactured again whenever the spindle motor is re-modeled to change the number of iron pieces of the core.

BRIEF SUMMARY

Exemplary embodiments of the present disclosure provide a spindle motor including a bearing housing, configured to match a magnetic field center of a iron piece and a magnetic field center of a magnet at all times free from shape alteration of the bearing housing, even if the number of iron pieces in a core is changed.

In one general aspect of the present disclosure, there is provided a spindle motor, the spindle motor comprising: a bearing assembly including a bearing housing that further includes a housing body and a plurality of staircase sills formed at a periphery of the bearing housing, and a bearing disposed inside the bearing housing; a stator including a core that further includes core pieces formed with through holes at which each of the staircase sills is hitched, and a coil wound on the core; a rotation shaft inserted into a rotation shaft hole of the bearing; and a rotor including a yoke coupled to the rotation shaft and a magnet secured at an inner lateral surface of the yoke to face the core.

In another general aspect of the present disclosure, there is provided a spindle motor, the spindle motor comprising: a bearing assembly including a bearing housing that further includes a floor plate, a housing body including a lateral plate extended from an edge of the floor plate, a bearing housing formed at a periphery of the lateral plate to include a plurality of staircase sills, and a bearing disposed inside the bearing housing; a rotation shaft inserted into a rotation shaft hole of the bearing; a stator including a core that further includes core pieces formed with through holes at which each of the staircase sills is hitched, and a coil wound on the core; and a rotor including a yoke coupled to the rotation shaft and a magnet secured at an inner lateral surface of the yoke to face the core.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

Accompanying drawings are included to provide a further understanding of arrangements and embodiments of the present disclosure and are incorporated in and constitute a part of this application. In the following drawings, like reference numerals refer to like elements and wherein.

DETAILED DESCRIPTION

Figure 1:
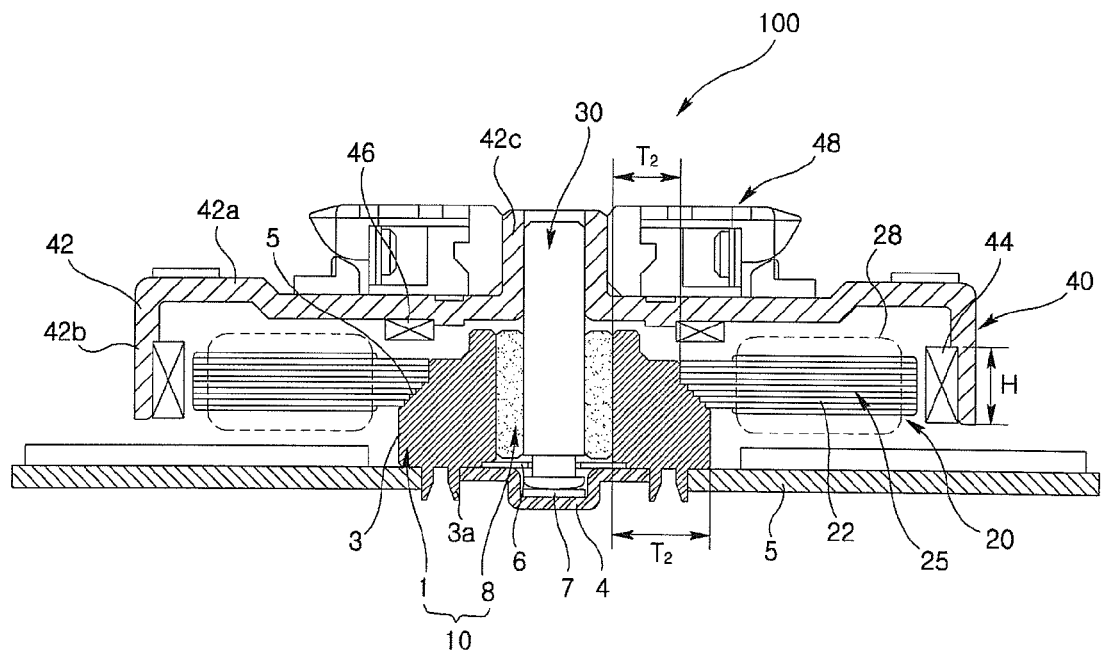
FIG. 1 is a cross-sectional view of a spindle motor according to an exemplary embodiment of the present disclosure.

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. The meaning will be clear from the context of the description. Like numbers refer to like elements throughout, and explanations that duplicate one another will be omitted.

Figure 2:
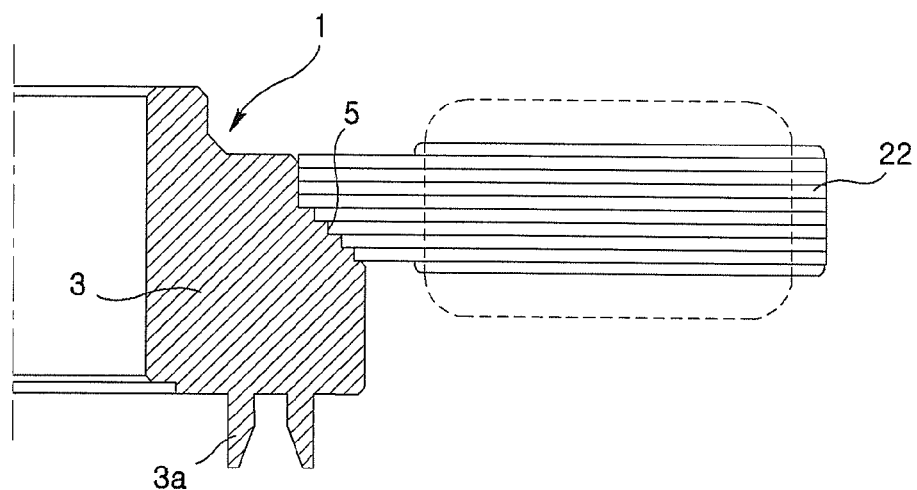
FIG. 2 is a cross-sectional view of a core and a bearing housing illustrated in FIG. 1.

FIG. 1 is a cross-sectional view of a spindle motor according to an exemplary embodiment of the present disclosure, FIG. 2 is a cross-sectional view of a core and a bearing housing illustrated in FIG. 1 and FIGS. 3, 4 and 5 are cross-sectional views illustrating a core having different number of core pieces at the bearing housing of FIG. 1.

Referring to FIG. 1, a spindle motor includes a bearing assembly (10) a stator (20), a rotation shaft (30) and a rotor (40). The bearing assembly (10) includes a bearing housing (1) and a bearing (8). The bearing housing (1) includes a housing body (3) and a plurality of staircase sills (5).

The housing body (3) is formed with a cylinder shape having an inner lateral surface formed by a hollow hole and an outer lateral surface facing the inner lateral surface. In the present exemplary embodiment, the housing body (3) is made of brass and may be formed by a press work.

The housing body (3) is assembled at a bottom surface by a bearing cover (4), and the bottom surface of the housing body (3) is protruded by a coupling lug (3a) for coupling with a base plate.

The plurality of staircase sills is formed at a periphery of the housing body (3). Thickness of housing body (3) corresponding to each of the plurality of staircase sills is intermittently decreased from a bottom to an upper surface by each of the plurality of staircase sills.

The housing body (3) corresponding to each bottom of staircase sills (5) is formed with a first thickness (T1) based on the staircase sills (5), and a housing body corresponding to each upper surface of staircase sills is formed with a second thickness (T2) thinner than the first thickness based on the staircase sills. A sill height of each staircase (5) sill is same as thickness of a core piece (described later).

The bearing (8) is arranged inside the bearing housing (1), and includes a rotation shaft hole into which a rotations shaft (20, described later) is inserted. In the present exemplary embodiment, the bearing (8) may include an oil impregnation sintered bearing.

Unexplained reference numerals 6 and 7 in FIG. 1 are respectively a washer and a thrust bearing. The stator (20) includes a core (25) and a coil (28).

The core (25) is formed by stacking a plurality of core pieces (22). In the present exemplary embodiment, the plurality of core pieces (22) may be formed in even numbers. For example, the core (25) may include eight, six or four core pieces (22).

Each of the core pieces (22) comprising the core (25) takes the shape of a disk of same diameter, and is also formed with a through hole of an appropriate diameter suitable to be coupled to each staircase sill (5), whereby each of the core pieces (22) may include through holes of mutually different sizes of diameters. Therefore, each core piece (22) may be sequentially coupled to each of the staircase sills (5).

In the present exemplary embodiment, due to the fact that thickness of the hosing body (3) corresponding to each staircase sill (5) is intermittently decreased from a bottom surface to an upper surface of the bearing housing by each staircase sill (5), the core pieces (22) are assembled from the upper surface of the bearing housing (1) to a direction of the bottom surface.

Due to the fact that thickness of each core piece (22) is substantially same as the sill height of each staircase sill (5), no gap is formed in the core pieces (22) to allow each core piece (22) to be tightly adhered, in a case the core pieces are coupled to the staircase sills (5).

Hereinafter, a core piece (22) centrally arranged to a thickness direction among the stacked core pieces (22) is defined as a central core piece.

The coil (28) is wound on a core (25) comprising of a plurality of core pieces (22), and a magnetic field is generated by application of a driving signal to the coil (28) wound on the core (25).

The rotation shaft (20) is inserted into a rotation shaft hole of the bearing (8), and a part of the rotation shaft (20) is protruded from the bearing (8) at a predetermined height.

The rotor (40) is coupled to the rotation shaft (20) protruded from the bearing (8) among the rotations shafts (20). The rotor (40) includes a yoke (42) and a magnet (44). The rotor (40) may further include a suction magnet (46) and a turn table (48), in addition to the yoke (42) and the magnet (44).

The yoke (42) takes the shape of a bottom surface-opened cylinder. To be more specific, the yoke (42) includes a yoke upper plate (42a) and a yoke lateral surface plate (42b).

The yoke upper plate (42a) takes the shape of a disk when viewed from a top plane view, and is centrally formed with a yoke burring unit (42c) formed from a bottom surface of the yoke upper plate (42a) to a direction facing the upper surface. The yoke burring unit (42c) is press-fitted into the rotation shaft (20), whereby the yoke (42) is rotated along with the rotation shaft (20). The yoke lateral surface plate (42b) is extended from an edge of the yoke upper plate (42a), and arranged in parallel with the rotation shaft (20). The core (25) is wrapped by the yoke lateral surface plate (42b).

The magnet (44) is arranged at an inner lateral surface of the yoke lateral surface plate (42b), whereby the magnet (44) is arranged opposite to the core (25) wound by the coil (28). The magnet (44) is formed with a predetermined height (H), and a position halving the magnet (44) based on height direction is defined as a magnet center (44).

The magnet center of the magnet (44) is arranged at the same position as that of the central core piece of the core thus defined. In a case the center magnet of the magnet (44) is positioned at a disengaged position from the central core piece, the rotational characteristics of spindle motor (100) is greatly reduced.

The suction magnet (46) is arranged at a bottom surface of the yoke upper plate (42a) facing the core (25), and is also arranged at a position opposite to the core (25). The suction magnet (46) generates a suction force to suck the core (25) to maintain a gap between the yoke (42) and the core (25) at a constant level.

Figure 3:
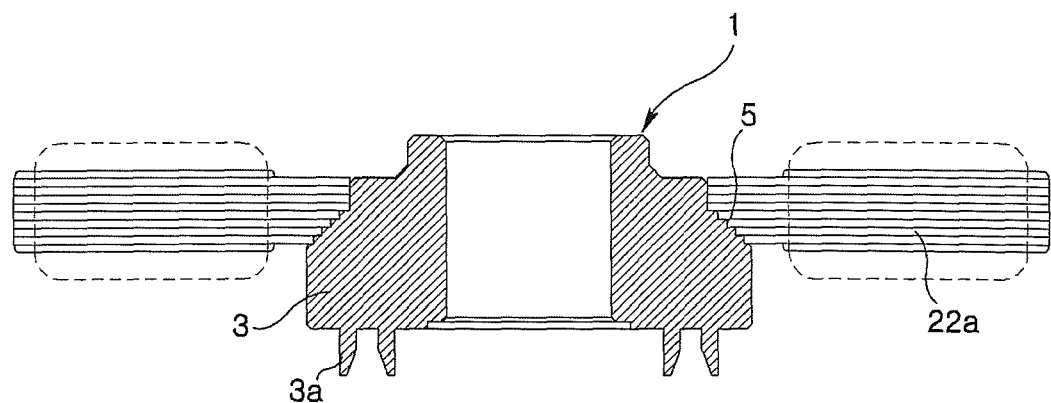
FIGS. 3, 4 and 5 are cross-sectional views illustrating a core having different number of core pieces at the bearing housing of FIG. 1.

The turntable (48) takes the shape of a disk, and is centrally formed with a through hole press-fitted into the yoke burring unit (42c). FIG. 3 illustrates eight core pieces (22a) mounted on the staircase sill (5) of bearing housing illustrated in FIG. 1. The central core piece among the eight core pieces (22a) in FIG. 3 is positioned at the same place as that of the center magnet of magnet (44) in FIG. 1.

Figure 4:
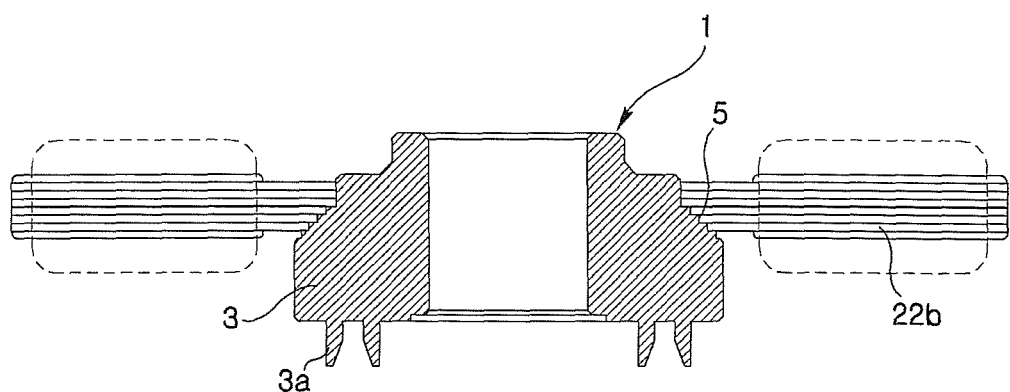

FIG. 4 illustrates six core pieces (22b) mounted at the staircase sill (5) of the bearing housing illustrated in FIG. 1. The six core pieces (22b) mounted at the staircase sill (5) may be realized by removing an uppermost core piece and a lowermost core piece among the eight core pieces (22a) illustrated in FIG. 3. The central core piece among the six core pieces (22b) of FIG. 4 is positioned at the same place as that of the center magnet of magnet (44) in FIG. 1.

Figure 5:
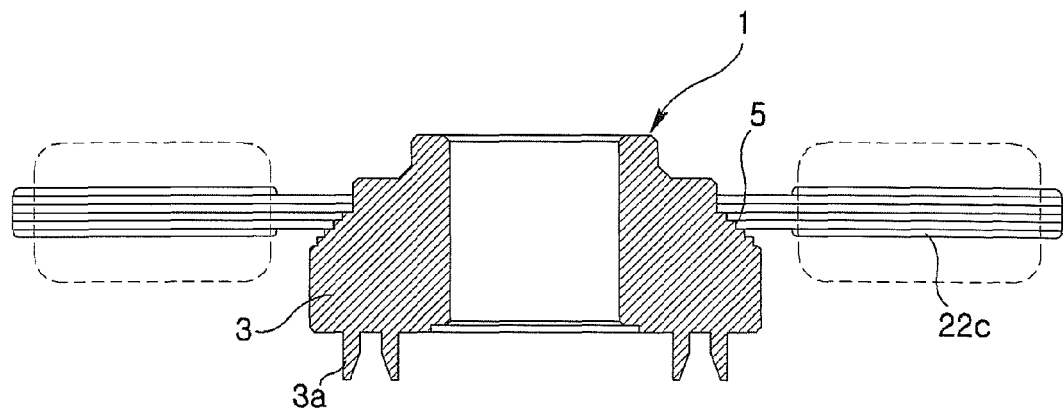

FIG. 5 illustrates four core pieces (22c) mounted on the staircase sill (5) of bearing housing illustrated in FIG. 1.

The four core pieces (22c) mounted at the staircase sill (5) in FIG. 5 may be realized by removing an uppermost core piece and a lowermost core piece among the six core pieces (22b) illustrated in FIG. 4. The central core piece among the four core pieces (22c) of FIG. 5 is positioned at the same place as that of the center magnet of magnet (44) in FIG. 1.

Although the present exemplary embodiment has described cores each with eight, six and four core pieces on the bearing housing (1) using the staircase sill (5) of the bearing housing (1), it should be apparent that cores with eight or more core pieces on the bearing housing (1), or cores with less than four core pieces on the bearing housing (1) can be alternatively utilized.

Figure 6:
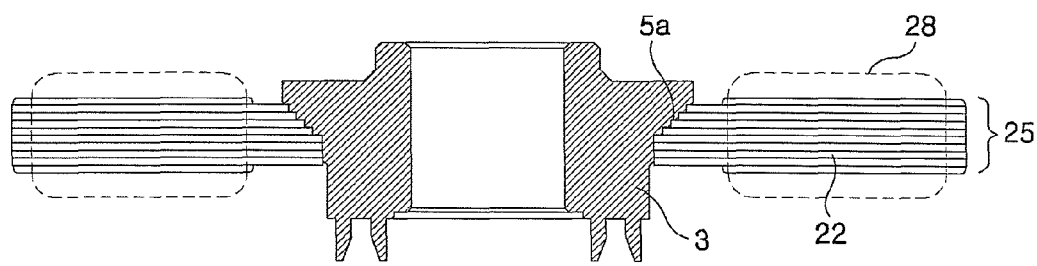
FIG. 6 is a cross-sectional view illustrating a bearing housing of a spindle motor according to another exemplary embodiment of the present disclosure.

FIG. 6 is a cross-sectional view illustrating a bearing housing of a spindle motor according to another exemplary embodiment of the present disclosure.

The bearing housing of spindle motor illustrated in FIG. 6 is substantially same configuration-wise, except for the staircase sills, as that of spindle motor respectively illustrated in FIGS. 1 through 5, such that it should be noted that explanations that duplicate one another will be omitted, and like reference numerals refer to like elements throughout.

Referring to FIGS. 1 through 6, the bearing housing (1) includes a housing body (3) and a plurality of staircase sills (5a).

The housing body (3) is formed with a cylinder shape having an inner lateral surface formed by a hollow hole and an outer lateral surface facing the inner lateral surface. In the present exemplary embodiment, the housing body (3) is made of brass and may be formed by a press work.

The housing body (3) is assembled at a bottom surface by a bearing cover (4), and the bottom surface of the housing body (3) is protruded by a coupling lug (3a) for coupling with a base plate.

The plurality of staircase sills (5a) is formed at a periphery of the housing body (3). Thickness of housing body (3) corresponding to each of the plurality of staircase sills (5a) is intermittently decreased from a bottom to an upper surface by each of the plurality of staircase sills (5a).

The housing body (3) corresponding to each bottom of staircase sills (5a) is formed with a first thickness based on the staircase sills (5a), and a housing body corresponding to each upper surface of staircase sills (5a) is formed with a second thickness thinner than the first thickness based on the staircase sills (5a). A sill height of each staircase (5a) sill is substantially same as thickness of a core piece (22) of the core (25), for example.

In the present exemplary embodiment, due to the fact that thickness of the housing body (3) corresponding to each staircase sill (5a) is intermittently increased from a bottom surface to an upper surface of the bearing housing by each staircase sill (5a), the core pieces (22) are assembled from the bottom surface of the bearing housing (1) to a direction of the upper surface.

In FIG. 6, the number of core pieces (22c) mounted at the staircase sill (5a) can be adjusted without any design change on bearing housing (1) by removing an uppermost core piece and a lowermost core piece among the core pieces (22) coupled to the staircase sill (5a), and the magnetic field centers of magnet (44) and the number-reduced core (25) are not changed to inhibit the rotational characteristic of the spindle motor from being degraded.

Figure 7:
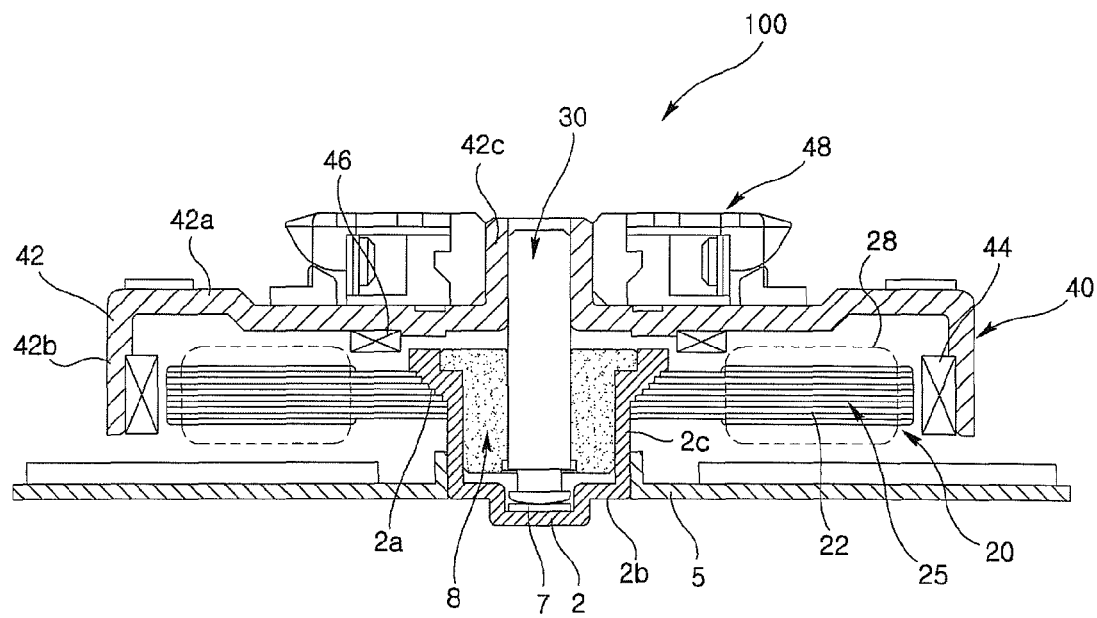
FIG. 7 is a cross-sectional view of a spindle motor according to another exemplary embodiment of the present disclosure.
Figure 8:
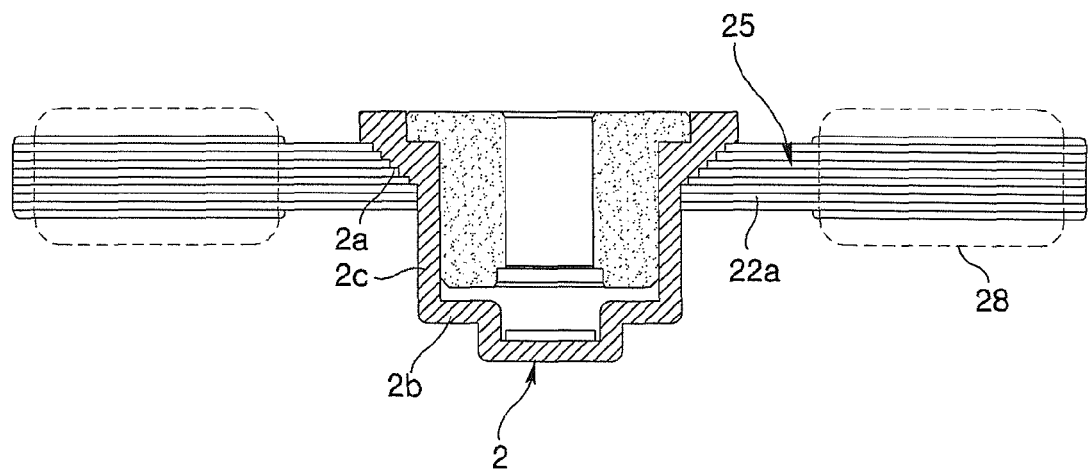
FIGS. 8, 9 and 10 are cross-sectional views illustrating a core having different number of core pieces at the bearing housing of FIG. 7.
Figure 9:
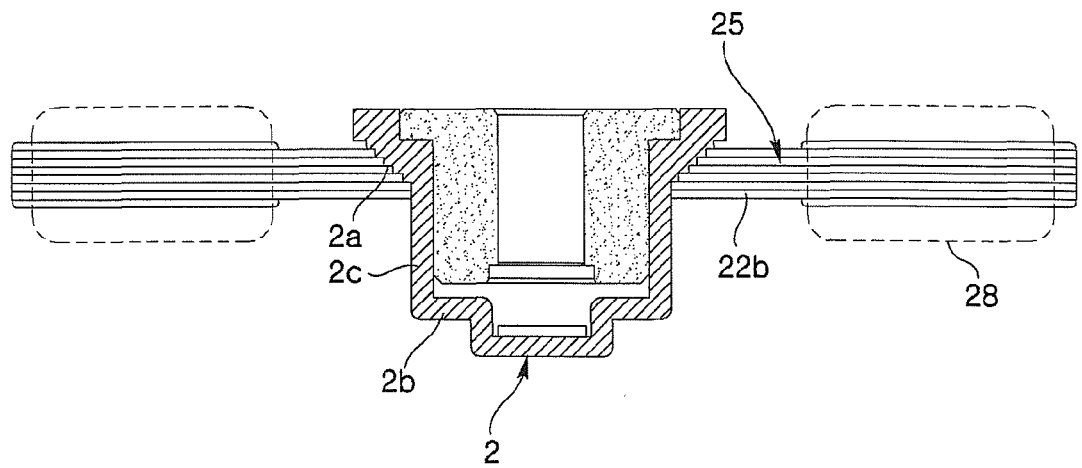
Figure 10:
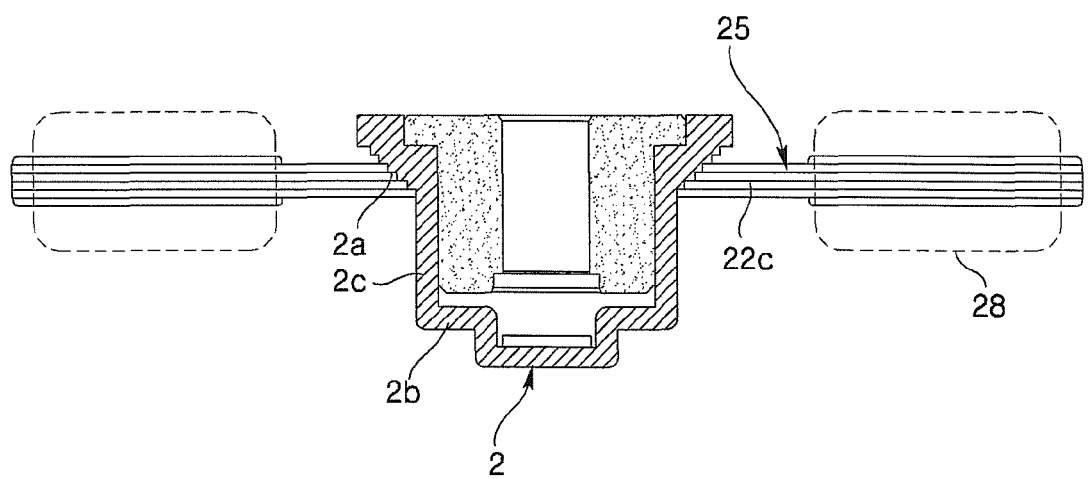

FIG. 7 is a cross-sectional view of a spindle motor according to another exemplary embodiment of the present disclosure, and FIGS. 8, 9 and 10 are cross-sectional views illustrating a core having different number of core pieces at the bearing housing of FIG. 7.

The bearing housing of spindle motor illustrated in FIG. 7 is substantially same configuration-wise, except for bearing housing, as that of spindle motor respectively illustrated in FIGS. 1 through 5, such that it should be noted that explanations that duplicate one another will be omitted, and like reference numerals refer to like elements throughout.

Referring to FIGS. 7 through 10, a bearing housing (2) includes staircase sills (2a).

The bearing housing (2) takes the shape of an upper surface-opened cylinder, and includes a floor plate (2b) and a lateral surface plate (2c) extended from an edge of the floor plate (2b). In the present exemplary embodiment, the bearing housing (2) may be formed by a press work.

A plurality of staircase sills (2a) is formed at a periphery of an upper distal end of the lateral surface plate (2c) at the bearing housing (2). Thickness of bearing housing (2) corresponding to each of the plurality of staircase sills (2a) is intermittently increased from a bottom to an upper surface by each of the plurality of staircase sills (2a).

The housing body (3) corresponding to each bottom of staircase sills (5a) is formed with a first thickness based on the staircase sills (5a), and a housing body corresponding to each upper surface of staircase sills (5a) is formed with a second thickness thinner than the first thickness based on the staircase sills (5a). A sill height of each staircase (2a) sill is substantially same as thickness of a core piece (22) of the core (25), for example.

In the present exemplary embodiment, due to the fact that thickness of the bearing housing (2) corresponding to each staircase sill (2a) is intermittently increased from a bottom surface to an upper surface by each staircase sill (2a), the core pieces (22) are assembled from the bottom surface of the bearing housing (1) to a direction of the upper surface.

In FIG. 7, the number of core pieces (22) mounted at the staircase sill (2a) can be adjusted without any design change on bearing housing (1) by removing an uppermost core piece and a lowermost core piece among the core pieces (22) coupled to the staircase sill (2a), and the magnetic field centers of magnet (44) and the number-reduced core (25) are not changed to inhibit the rotational characteristic of the spindle motor from being degraded.

FIG. 8 illustrates eight core pieces (22a) mounted on the staircase sill (2a) of bearing housing (2) illustrated in FIG. 7.

The central core piece among the eight core pieces (22a) of FIG. 8 is positioned at the same place as that of the center magnet of magnet (44) in FIG. 7.

FIG. 9 illustrates six core pieces (22b) mounted on the staircase sill (2a) of bearing housing (2) illustrated in FIG. 7. The six core pieces (22b) illustrated in FIG. 9 may be realized by removing an uppermost core piece and a lowermost core piece among the eight core pieces (22a) illustrated in FIG. 8. The central core piece among the six core pieces (22b) of FIG. 9 is positioned at the same place as that of the center magnet of magnet (44) in FIG. 7.

FIG. 10 illustrates four core pieces (22c) mounted on the staircase sill (2a) of bearing housing (2) illustrated in FIG. 7. The four core pieces (22c) illustrated in FIG. 10 may be realized by removing an uppermost core piece and a lowermost core piece among the six core pieces (22a) illustrated in FIG. 9. The central core piece among the four core pieces (22c) of FIG. 10 is positioned at the same place as that of the center magnet of magnet (44) in FIG. 7.

Although the present exemplary embodiment has described cores each with eight, six and four core pieces on the bearing housing (2) using the staircase sill (2a) of the bearing housing (2), it should be apparent that cores with eight or more core pieces on the bearing housing (2), or cores with less than four core pieces on the bearing housing (1) can be alternatively utilized.

As apparent from the foregoing, the spindle motor according to the present disclosure has an industrial applicability and advantageous effect in that the number of core pieces mounted at the bearing housing can be altered without any design change on bearing housing, and the magnetic field centers of magnet and central core piece among core pieces can be matched despite the changed number of core pieces, to inhibit the rotational characteristic of the spindle motor from being degraded.

Any reference in this specification to "one embodiment," "an embodiment," "exemplary embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A spindle motor, the spindle motor comprising:
   a bearing assembly including a hearing housing that has a housing body and a plurality of staircase sills on a side surface of the bearing housing, and a bearing inside the bearing housing, a thickness of the housing body corresponding to a thickness of each staircase sill being gradually changed;
   a stator including a core and a coil wound on the core, the core including a plurality of core pieces, each core piece having a through hole and coupling to each staircase sill via the through hole, diameters of the through holes being gradually changed corresponding to each staircase sill;
   a rotation shaft inserted into a rotation shaft hole of the bearing; and
   a rotor including a yoke coupled to the rotation shaft and a magnet secured at an inner lateral surface of the yoke to face the core;
   wherein a height of each core piece is configured to be substantially same as a height of each staircase sill such that no gap is formed between each core piece and each staircase sill when each core piece is coupled to each staircase sill.

2. The spindle motor of claim 1, wherein a center core piece centrally arranged at the core pieces is arranged at a position that halves a height of the magnet.

3. The spindle motor of claim 1, wherein an outer diameter of each core piece is substantially identical.

4. The spindle motor of claim 1, wherein the core pieces are formed in even numbers.

5. The spindle motor of claim 1, wherein the thickness of the housing body corresponding to each staircase sill is gradually decreased.

6. The spindle motor of claim 1, wherein the thickness of the housing body corresponding to each staircase sill is gradually increased.

7. The spindle motor of claim 1, wherein the bearing housing takes the shape of a cylinder.

8. The spindle motor of claim 1, wherein the bearing housing includes a brass cast bearing.

9. The spindle motor of claim 1, further comprising a bearing cover at a bottom surface of the housing body.

10. A spindle motor, the spindle motor comprising:
    a bearing assembly comprising:
      a housing body having a floor plate and a lateral plate extended from an edge of the floor plate,
      a bearing housing including a plurality of staircase sills on the lateral plate, a thickness of the housing body corresponding to a thickness of each staircase sill being gradually changed, and
      a bearing inside the bearing housing;
    a rotation shaft inserted into a rotation shaft hole of the bearing;
    a stator comprising:
      a core including a plurality of core pieces, each core piece having a through hole and coupling to each staircase sill via the through hole, diameters of through holes being gradually changed corresponding to each staircase sill, and
      a coil wound on the core; and
    a rotor comprising:
      a yoke coupled to the rotation shaft, and
      a magnet secured at an inner lateral surface of the yoke to face the core;
    wherein a height of each core piece is configured to be substantially same as a height of each staircase sill such that no gap is formed between each core piece and each staircase sill when each core niece is coupled to each staircase sill.

11. The spindle motor of claim 10, wherein a center core piece centrally arranged at the core pieces is arranged at a position that halves a height of the magnet.

12. The spindle motor of claim 10, wherein an outer diameter of each core piece is substantially identical.

13. The spindle motor of claim 10, wherein a diameter of each staircase sill is gradually increased from a bottom to an upper surface of the housing body.

14. The spindle motor of claim 10, wherein the bearing housing is formed by press work.

15. The spindle motor of claim 10, wherein a diameter of an upper surface at an inner circumferential surface of the bearing housing is expanded, and a diameter of a portion corresponding to the portion where the diameter is expanded in the inner circumferential surface of the bearing housing corresponds to an inner circumferential surface of the bearing housing.

16. The spindle motor of claim 10, wherein the core pieces are formed in even numbers.

17. The spindle motor of claim 10, wherein the bearing housing takes the shape of an upper surface-opened cylinder.

* * * * *